United States Patent
Nakagawa (10) Patent No.: US 10,363,832 B2
(45) Date of Patent: Jul. 30, 2019

(54) VEHICLE PARKING CONTROL DEVICE

(71) Applicant: HONDA MOTOR CO., LTD., Tokyo (JP)

(72) Inventor: Tomoaki Nakagawa, Sakura (JP)

(73) Assignee: HONDA MOTOR CO., LTD., Tokyo (JP)

(*) Notice: Subject to any disclaimer, the term of this patent is extended or adjusted under 35 U.S.C. 154(b) by 211 days.

(21) Appl. No.: 15/058,638

(22) Filed: Mar. 2, 2016

(65) Prior Publication Data

US 2016/0257222 A1 Sep. 8, 2016

(30) Foreign Application Priority Data

Mar. 6, 2015 (JP) .................. 2015-044871

(51) Int. Cl.
*B60L 15/20* (2006.01)
*B60L 53/12* (2019.01)
*B60L 53/38* (2019.01)

(52) U.S. Cl.
CPC .......... *B60L 15/2063* (2013.01); *B60L 53/12* (2019.02); *B60L 53/38* (2019.02); *B60L 15/2009* (2013.01);
(Continued)

(58) Field of Classification Search
CPC ............. Y02T 10/7005; Y02T 10/7275; Y02T 10/645; Y02T 10/7072; Y02T 10/72; Y02T 10/7291; Y02T 90/12; Y02T 90/121; Y02T 90/122; Y02T 90/125; Y02T 90/14; Y02T 90/16; B60L 11/182; B60L 15/2009; B60L 15/2063; B60L 2240/42; B60L 2240/62; B60L 2250/26; B60L 53/12; B60L 53/38;
(Continued)

(56) References Cited

U.S. PATENT DOCUMENTS 5,020,645 A * 6/1991 Sasa ...................... B60W 10/02
192/3.63
5,481,168 A * 1/1996 Mutoh .................. B60L 15/025
318/432
(Continued)

FOREIGN PATENT DOCUMENTS

JP 2004-352117 A 12/2004
JP 2012-228119 A 11/2012

OTHER PUBLICATIONS

Office Action dated Aug. 30, 2016, issued in counterpart Japanese Patent Application No. 2015-044871, with English translation. (7 pages).

*Primary Examiner* — Angelina Shudy
(74) *Attorney, Agent, or Firm* — Westerman, Hattori, Daniels & Adrian, LLP (57) ABSTRACT

At a time that a parking operation is performed, a vehicle parking control device detects that a power receiving pad of an electric vehicle lies within a characteristics modifying range. Furthermore, the vehicle parking control device detects that other predetermined conditions are satisfied. In the case that the power receiving pad is positioned inside of the characteristics modifying range, and if all of the predetermined conditions have been satisfied, an acceleration-OFF-state movement characteristic of the vehicle, for example, a creep torque characteristic or a brake hydraulic pressure characteristic, is switched to an appropriate characteristic from a characteristic thereof at normal times.

7 Claims, 8 Drawing Sheets

(52) U.S. Cl.
CPC ..... *B60L 2240/12* (2013.01); *B60L 2240/642* (2013.01); *B60L 2250/26* (2013.01); *B60L 2260/22* (2013.01); *B60L 2260/32* (2013.01); *Y02T 10/645* (2013.01); *Y02T 10/7005* (2013.01); *Y02T 10/7072* (2013.01); *Y02T 10/72* (2013.01); *Y02T 10/7275* (2013.01); *Y02T 10/7291* (2013.01); *Y02T 90/12* (2013.01); *Y02T 90/121* (2013.01); *Y02T 90/122* (2013.01); *Y02T 90/125* (2013.01); *Y02T 90/14* (2013.01); *Y02T 90/16* (2013.01)

(58) Field of Classification Search
CPC .......... B60L 2240/12; B60L 2240/642; B60L 2260/22; B60L 2260/32
USPC .......................................................... 701/22
See application file for complete search history.

(56) References Cited

U.S. PATENT DOCUMENTS

| | | | | |
|---|---|---|---|---|
| 5,813,940 A * | 9/1998 | Ramm | ................ | F16H 61/20 477/176 |
| 5,905,349 A * | 5/1999 | Farkas | ................ | B60L 7/18 318/139 |
| 6,278,916 B1 * | 8/2001 | Crombez | ................ | B60L 7/26 180/197 |
| 6,377,007 B1 * | 4/2002 | Ozaki | ................ | B60L 15/2009 318/139 |
| 6,404,072 B2 * | 6/2002 | Onoyama | ................ | B60K 6/485 290/40 A |
| 6,658,327 B1 * | 12/2003 | Reppich | ................ | B60K 26/00 307/10.4 |
| 6,868,323 B2 * | 3/2005 | Kichima | ................ | B60K 31/0008 188/156 |
| 6,918,854 B2 * | 7/2005 | Okada | ................ | B60K 31/04 477/114 |
| 7,032,697 B2 * | 4/2006 | Lee | ................ | B60K 6/48 180/65.25 |
| 7,295,918 B2 * | 11/2007 | Nada | ................ | B60W 30/18118 701/116 |
| 7,988,593 B2 * | 8/2011 | Staub | ................ | B60W 20/10 477/3 |
| 8,315,752 B2 * | 11/2012 | Kwon | ................ | B60L 15/2009 318/452 |
| 8,326,510 B2 * | 12/2012 | Tang | ................ | B60L 7/18 180/197 |
| 8,478,467 B2 * | 7/2013 | Tang | ................ | B60L 15/2063 180/65.285 |
| 8,483,899 B2 * | 7/2013 | Martin | ................ | B60L 11/1833 320/109 |
| 8,958,944 B2 * | 2/2015 | Jung | ................ | B60W 30/18063 477/92 |
| 9,123,152 B1 * | 9/2015 | Chatham | ................ | G06T 17/005 |
| 9,457,811 B2 * | 10/2016 | Yu | ................ | B60W 10/06 |
| 9,726,518 B2 * | 8/2017 | Widmer | ................ | G01D 5/2006 |
| 9,944,200 B2 * | 4/2018 | Ochocinski | ................ | B60L 15/2063 |
| 10,071,653 B2 * | 9/2018 | Meyer | ................ | B60L 50/61 |
| 2001/0013701 A1 * | 8/2001 | Onoyama | ................ | B60K 6/485 290/40 C |
| 2011/0285349 A1 * | 11/2011 | Widmer | ................ | B60L 11/182 320/108 |
| 2012/0091959 A1 * | 4/2012 | Martin | ................ | B60L 11/1829 320/109 |
| 2013/0017928 A1 * | 1/2013 | Oh | ................ | F16H 61/20 477/94 |
| 2013/0278212 A1 * | 10/2013 | Kai | ................ | B60L 11/182 320/108 |
| 2014/0002015 A1 * | 1/2014 | Tripathi | ................ | B60L 11/182 320/108 |
| 2014/0015329 A1 * | 1/2014 | Widmer | ................ | G01D 5/2006 307/104 |
| 2014/0015522 A1 * | 1/2014 | Widmer | ................ | G01D 5/2006 324/239 |
| 2014/0039728 A1 | 2/2014 | Imazu et al. | | |
| 2014/0095021 A1 * | 4/2014 | Tate | ................ | B62D 15/028 701/36 |
| 2014/0129068 A1 * | 5/2014 | Higa | ................ | B60K 6/445 701/22 |
| 2014/0174870 A1 * | 6/2014 | Niizuma | ................ | H02J 5/005 191/10 |
| 2014/0303823 A1 * | 10/2014 | Nakanishi | ................ | B60K 6/48 701/22 |
| 2014/0320090 A1 * | 10/2014 | Keeling | ................ | B60L 11/1829 320/162 |
| 2014/0371969 A1 * | 12/2014 | Asai | ................ | B60L 7/14 701/22 |
| 2015/0015419 A1 * | 1/2015 | Halker | ................ | B60L 11/1827 340/901 |
| 2015/0042168 A1 * | 2/2015 | Widmer | ................ | B60L 11/1829 307/104 |
| 2015/0137801 A1 * | 5/2015 | Raedy | ................ | B60L 11/1833 324/207.15 |
| 2015/0177302 A1 * | 6/2015 | Lu | ................ | G01R 29/0814 324/72 |
| 2015/0255993 A1 * | 9/2015 | Kuerschner | ................ | B60L 11/182 307/104 |
| 2015/0343916 A1 * | 12/2015 | Kim | ................ | B60L 11/1835 701/22 |
| 2016/0052521 A1 * | 2/2016 | Cho | ................ | B60T 1/10 477/27 |
| 2016/0114687 A1 * | 4/2016 | Ichikawa | ................ | B60L 5/005 701/22 |
| 2016/0214504 A1 * | 7/2016 | Park | ................ | B60L 3/12 |
| 2017/0096134 A1 * | 4/2017 | Yoon | ................ | B60K 6/547 |
| 2017/0282740 A1 * | 10/2017 | Ichikawa | ................ | B60L 11/02 |
| 2017/0315557 A1 * | 11/2017 | Vogt | ................ | G05D 1/0225 |
| 2018/0009434 A1 * | 1/2018 | Hayakawa | ................ | B60K 6/445 |
| 2018/0137972 A1 * | 5/2018 | Widmer | ................ | B60L 11/182 |

* cited by examiner

VEHICLE PARKING CONTROL DEVICE

CROSS-REFERENCE TO RELATED APPLICATION

This application is based upon and claims the benefit of priority from Japanese Patent Application No. 2015-044871 filed on Mar. 6, 2015, the contents of which are incorporated herein by reference.

BACKGROUND OF THE INVENTION

Field of the Invention

The present invention relates to a vehicle parking control device that enables a vehicle to be stopped in positional alignment with a target position.

Description of the Related Art

Recently, electric vehicles, for example, an electric vehicle that is driven only by a storage battery, a hybrid vehicle equipped with an engine and an electric motor, a range extender vehicle, and a fuel cell vehicle equipped with a fuel cell, etc., have been developed. Together with the development of electric vehicles, techniques have been developed in relation to non-contact charging for charging the batteries of such electric vehicles in a non-contact manner.

Non-contact charging possesses an advantage in that workload when performing a charging operation can be reduced as compared to contact charging. On the other hand, charging efficiency becomes reduced when a power receiving coil (secondary coil), which is provided on the electric vehicle, is not aligned in position accurately with respect to a power supplying coil (primary coil) disposed on the ground surface, and in a worst case, transmission of electric power cannot be performed at all. Therefore, high parking accuracy is demanded of the driver.

For reducing the workload imposed on the driver, means which do not require high parking accuracy have been developed. For example, by modifying the shapes of the power supplying coil and the power receiving coil, or by devising circuit systems (resonance type, electromagnetic induction type, etc.), techniques have been developed, which possess a characteristic of maintaining efficiency even if positional shifting occurs to some degree. However, in such techniques, it is necessary for the coil size to be increased in order to raise efficiency in the case that a large positional shift or deviation occurs. Further, the efficiency differs depending on the amount of positional shifting. As a result, for carrying out charging with high efficiency, there is a need for the driver to park the vehicle in a position of high efficiency.

As a technique for carrying out highly accurate positional alignment of a power receiving coil with respect to a power supplying coil, the following technique is disclosed, for example, in Japanese Laid-Open Patent Publication No. 2012-228119. According to the technique disclosed in Japanese Laid-Open Patent Publication No. 2012-228119, when the power receiving coil of an electric vehicle becomes closer to, i.e., in the vicinity of, a power supplying coil that is arranged in a parking space, a torque characteristic is changed such that the drive torque of the electric motor provided in the electric vehicle becomes smaller (see claim 1 and FIG. 3 of the publication). When this is done, since the electric vehicle does not move at high speed even if the operated amount of an accelerator pedal is large to a certain degree, it becomes easier for minute movements to be performed accompanying operation of the accelerator pedal. As a result, positional alignment is facilitated, and parking accuracy is improved.

SUMMARY OF THE INVENTION

According to the technique disclosed in Japanese Laid-Open Patent Publication No. 2012-228119, the drive torque is modified at such a timing that the distance between the power supplying coil and the power receiving coil falls to or below a predetermined value. When the behavior of the vehicle by operation of the accelerator pedal is changed during parking, the driver experiences a feeling of discomfort when operating the vehicle. For example, if the drive torque is reduced during a time that the driver operates the accelerator pedal on a gentle upward slope, then the vehicle may stop. When this takes place, the driver experiences a sense of discomfort in operating the vehicle and then feels stressed.

The present invention has been devised taking into consideration the aforementioned problem, and has the object of providing a vehicle parking control device, which allows the driver to operate the vehicle at a time of parking without experiencing any sense of discomfort, and further is capable of improving parking accuracy.

A vehicle parking control device according to the present invention includes a target position specifying unit configured to specify a target position as a target at a time when a vehicle is stopped, a predetermined range setting unit configured to set a predetermined range that includes the target position, a judgment unit configured to determine whether or not a reference position of the vehicle is positioned inside of the predetermined range, and a switching unit configured to switch between acceleration-OFF-state movement characteristics of the vehicle, if the reference position of the vehicle is positioned inside of the predetermined range, and further if a predetermined condition is satisfied.

According to the present invention, since the acceleration-OFF-state movement characteristics of the vehicle are switched when the parking operation is performed, it becomes easy to adjust the position of the vehicle and parking accuracy can be improved. As a result, parking can be performed at a position with high charging efficiency, and charging efficiency can be improved. Furthermore, since the acceleration-OFF-state movement characteristics are switched not only by ensuring that the reference position of the vehicle is positioned inside of a predetermined range, but also by ensuring that another predetermined condition is satisfied, vehicle operations during parking are carried out without the driver experiencing any sense of discomfort.

Further, in the present invention, it is possible for the switching unit to switch between the movement characteristics of the vehicle by modifying a creep torque characteristic of the vehicle. In this manner, since the creep torque, which does not rely on the accelerator pedal operation amount in accordance with the intentions of the driver, is modified, the vehicle does not assume behaviors that are contrary to the intentions of the driver. Therefore, the driver does not experience any sense of discomfort in operating the vehicle.

Further, in the present invention, there may further be included a vehicle speed judgment unit configured to determine a vehicle speed, wherein while the reference position of the vehicle is positioned inside of the predetermined range, that the vehicle speed judgment unit detects that the vehicle speed has become zero is regarded as the predetermined condition. In this manner, by modifying the creep torque characteristic after the vehicle speed has become zero, that is, after having temporarily stopped, the behavior of the vehicle does not change suddenly. Therefore, the driver does not experience any sense of discomfort in operating the vehicle.

Further, in the present invention, it is possible for the switching unit to switch between the movement characteristics of the vehicle by modifying a brake hydraulic pressure characteristic with respect to a brake depression amount. In this manner, by modifying the brake hydraulic pressure characteristic, the vehicle can be stopped by the driver increasing the brake depression amount. Therefore, in the event that the vehicle behaves contrary to the intentions of the driver, the driver can stop the vehicle immediately.

Further, in the present invention, there may further be included an inclination estimating unit configured to estimate an inclination state in a longitudinal direction of the vehicle, wherein the switching unit may switch between the movement characteristics of the vehicle depending on the inclination state of the vehicle that is estimated by the inclination estimating unit. By estimating the direction of inclination in this manner, whether the parking position is on an upward slope or a downward slope, the appropriate movement characteristic can be selected. Therefore, stopping or acceleration of the vehicle contrary to the intentions of the driver can be suppressed.

Further, in the present invention, the target position may be an installation position of a power supplying unit configured to supply electric power by way of magnetism, the reference position of the vehicle may be a mounted position of a power receiving unit configured to receive electric power by way of magnetic coupling with the power supplying unit, and the predetermined range may be greater than a charging capable range within which the power supplying unit and the power receiving unit are capable of being magnetically coupled. In this manner, by enlarging the predetermined range to be greater than the charging capable range, the movement characteristics can be modified before the power receiving unit of the vehicle becomes positioned inside of the charging capable range in which non-contact charging is possible. Therefore, when the power receiving unit is aligned in position with respect to the power supplying unit, a number of forward and rearward movements of the vehicle can be suppressed.

Further, in the present invention, there may further be included a battery capacity estimating unit configured to estimate a state of charge of a battery, wherein the battery capacity estimating unit estimating the state of charge of the battery as being less than or equal to a predetermined value can be regarded as the predetermined condition. In this manner, by switching the vehicle characteristics only in the case where the battery capacity is low and it is necessary for charging to be performed in a short time, stress at the time of parking can be reduced.

Further, in the present invention, there may further be provided a display device configured to display the predetermined range and the charging capable range. In this manner, by displaying the predetermined range and the charging capable range at the time of parking, parking accuracy can be improved.

Further, in the present invention, the switching unit is capable of prohibiting the movement characteristics from being switched in the event that the predetermined condition is not satisfied. Therefore, unnecessary switching can be suppressed, and drivability can be enhanced.

Further, the present invention includes a target position specifying unit configured to specify a target position as a target at a time when a vehicle is stopped, a predetermined range setting unit configured to set a predetermined range that includes the target position, a judgment unit configured to determine whether or not a reference position of the vehicle is positioned inside of the predetermined range, and a brake hydraulic pressure characteristic modifying unit configured to modify a brake hydraulic pressure characteristic with respect to a brake depression amount when the reference position of the vehicle is positioned inside of the predetermined range. In this manner, by modifying the brake hydraulic pressure characteristic, the vehicle can be stopped by the driver increasing the brake depression amount. Therefore, in the event that the vehicle behaves contrary to the intentions of the driver, the driver can stop the vehicle immediately.

According to the present invention, since the acceleration-OFF-state movement characteristics are switched when the parking operation is performed, parking accuracy can be improved. Furthermore, since the acceleration-OFF-state movement characteristics are switched not only by ensuring that the reference position of the vehicle is positioned inside of a predetermined range, but also by ensuring that another predetermined condition is satisfied, vehicle operations during parking are carried out without the driver experiencing any sense of discomfort.

The above and other objects features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Below, a preferred embodiment of a vehicle parking control device according to the present invention will be described in detail below with reference to the accompanying drawings.

[Configuration of Non-Contact Charging System 10]

Figure 1:
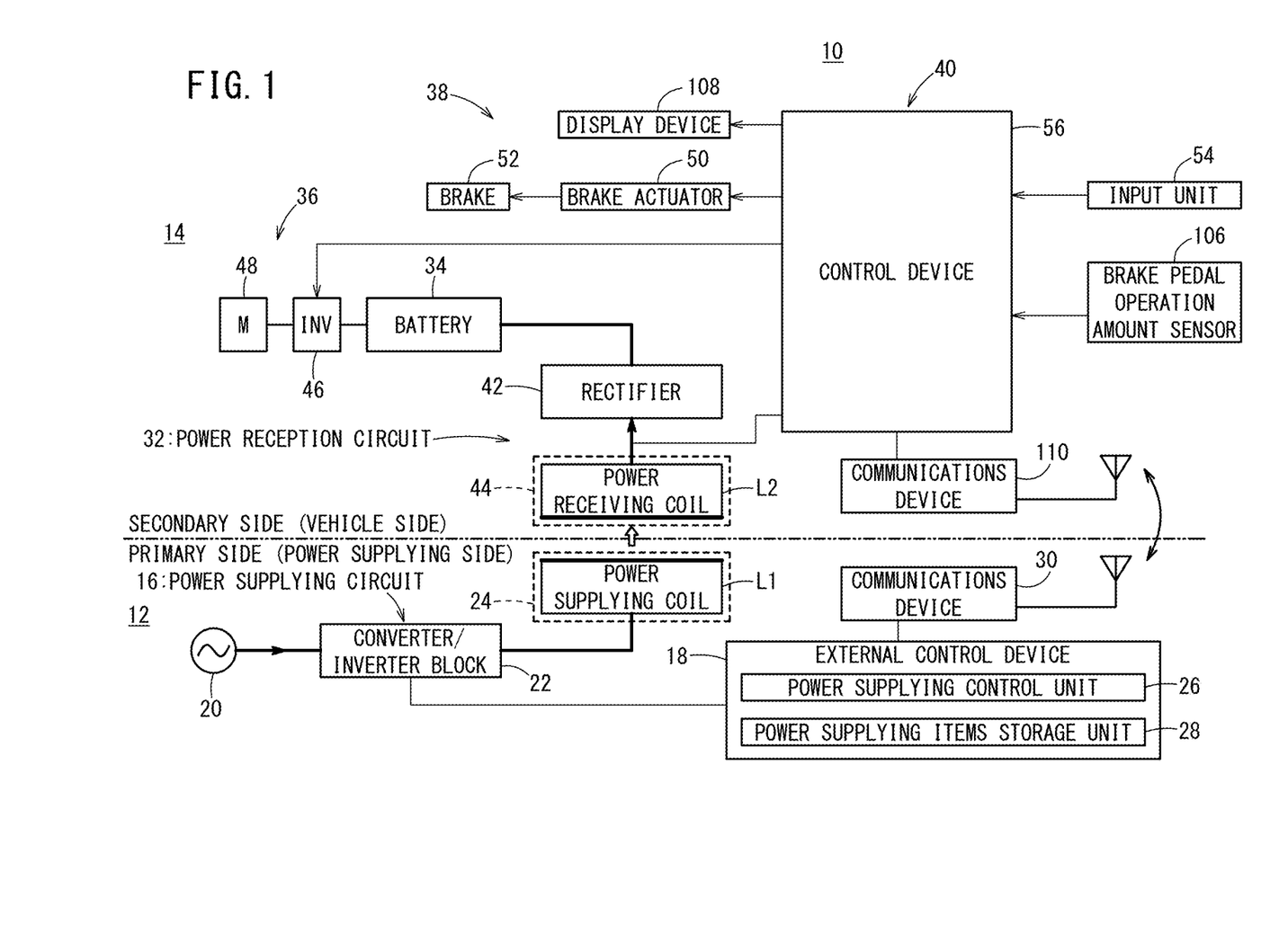
FIG. 1 is a drawing of the system configuration of a non-contact charging system.

With reference to FIG. 1, a non-contact charging system 10 including a vehicle parking control device 40 according to the present invention will be described. The non-contact charging system 10 is constituted by an external power supplying device 12 of a primary side (power supplying side) disposed on a ground surface (road surface), and an electric vehicle 14 of a secondary side (power receiving side). In FIG. 1, the constituent elements on the lower side of the two-dot-dashed line indicate the external power supplying device 12, whereas the constituent elements on the upper side of the two-dot-dashed line indicate the electric vehicle 14. In the non-contact charging system 10, a battery 34, which is mounted in the electric vehicle 14, is charged in a non-contact manner by the external power supplying device 12.

As will be described in accordance with the present embodiment, the non-contact charging system 10 makes use of a magnetic resonance type of non-contact power transmission system. Other than a magnetic resonance type, non-contact charging in which electromagnetic induction is utilized can also be used.

The external power supplying device 12 primarily comprises a power supplying circuit 16 and an external control device 18. The power supplying circuit 16 comprises an AC power source device 20, a converter/inverter block 22, and a power supplying antenna of the primary side (power supplying side), which is made up from a primary capacitor (not shown) and a power supplying coil (primary coil) L1 that serve as a resonant circuit. The converter/inverter block 22 converts AC power supplied from the AC power source device 20 into the supplied electric power. The power supplying coil L1 is arranged on a ground surface (road surface) by being embedded in a power supplying pad (power supplying unit) 24.

The external control device 18 is constituted from an ECU (electronic control unit). The ECU is a calculating device including a microcomputer, which contains a CPU (central processing unit), a ROM (including an EEPROM) and a RAM (random access memory) as memories, and further contains input/output devices such as an A/D converter, a D/A converter, and the like, and a timer that functions as a timing unit. By the CPU reading out and executing programs stored in the ROM, the ECU functions as various function realizing units (function realizing means), for example, a controller, a computation unit, and a processing unit, etc.

In the present embodiment, the external control device 18 functions as a power supplying control unit 26. The power supplying control unit 26 carries out a PWM (Pulse Width Modulation) drive control, which is a duty ratio control, of the converter/inverter block 22. Further, an ON/OFF switching control of the converter/inverter block 22 also is controlled. Furthermore, the external control device 18 comprises a power supplying items storage unit 28 in which characteristics of the power supplying coil L1 and specifications of the power supplying pad 24 are stored.

A communications device 30 is connected to the external control device 18. Through the communications device 30, the external control device 18 transmits information to the electric vehicle 14, and further receives information from the electric vehicle 14.

The electric vehicle 14 primarily comprises a power reception circuit 32, the battery 34, a vehicle propulsion unit 36, a vehicle brake unit 38, and the vehicle parking control device 40. The power reception circuit 32 is constituted from a power receiving antenna (power receiving side antenna) made up from a secondary capacitor (not shown) and a power receiving coil (secondary coil) L2 that serve as a resonance circuit, and a rectifier 42 that rectifies the received electric power (load power), which is an AC power received by the power receiving coil L2. The power receiving coil L2 is arranged on a lower surface of the electric vehicle 14 by being embedded in a power receiving pad (power receiving unit) 44.

The battery 34 is a lithium ion battery or the like, which is charged by the external power supplying device 12 through the power reception circuit 32, when the power supplying coil L1 and the power receiving coil L2 are magnetically coupled.

The vehicle propulsion unit 36 comprises an inverter 46 that converts a voltage (battery voltage) Vb of the battery 34 into an alternating current, and a motor-generator 48 for vehicle propulsion that is driven by the inverter 46. Furthermore, the vehicle propulsion unit 36 comprises a transmission (not shown) that transmits rotary power from the motor-generator 48 to the drive wheels (not shown). The inverter 46 generates at the motor-generator 48 a creep torque responsive to a torque command that is output from a later-described control device 56. A creep torque characteristic 102 (see FIG. 6) corresponds to an acceleration-OFF-state movement characteristic of the vehicle.

The vehicle brake unit 38 comprises a brake actuator 50 that changes the hydraulic pressure of a brake fluid (brake hydraulic pressure) responsive to an amount of operation of a brake pedal (not shown), and a brake 52 that receives the brake hydraulic pressure and breaks the drive wheels (not shown). The brake actuator 50 causes a brake hydraulic pressure, which is responsive to a brake hydraulic pressure command output from a later-described control device 56, to act on the brake 52. A brake hydraulic pressure characteristic 104 corresponds to an acceleration-OFF-state movement characteristic of the vehicle.

Figure 2:
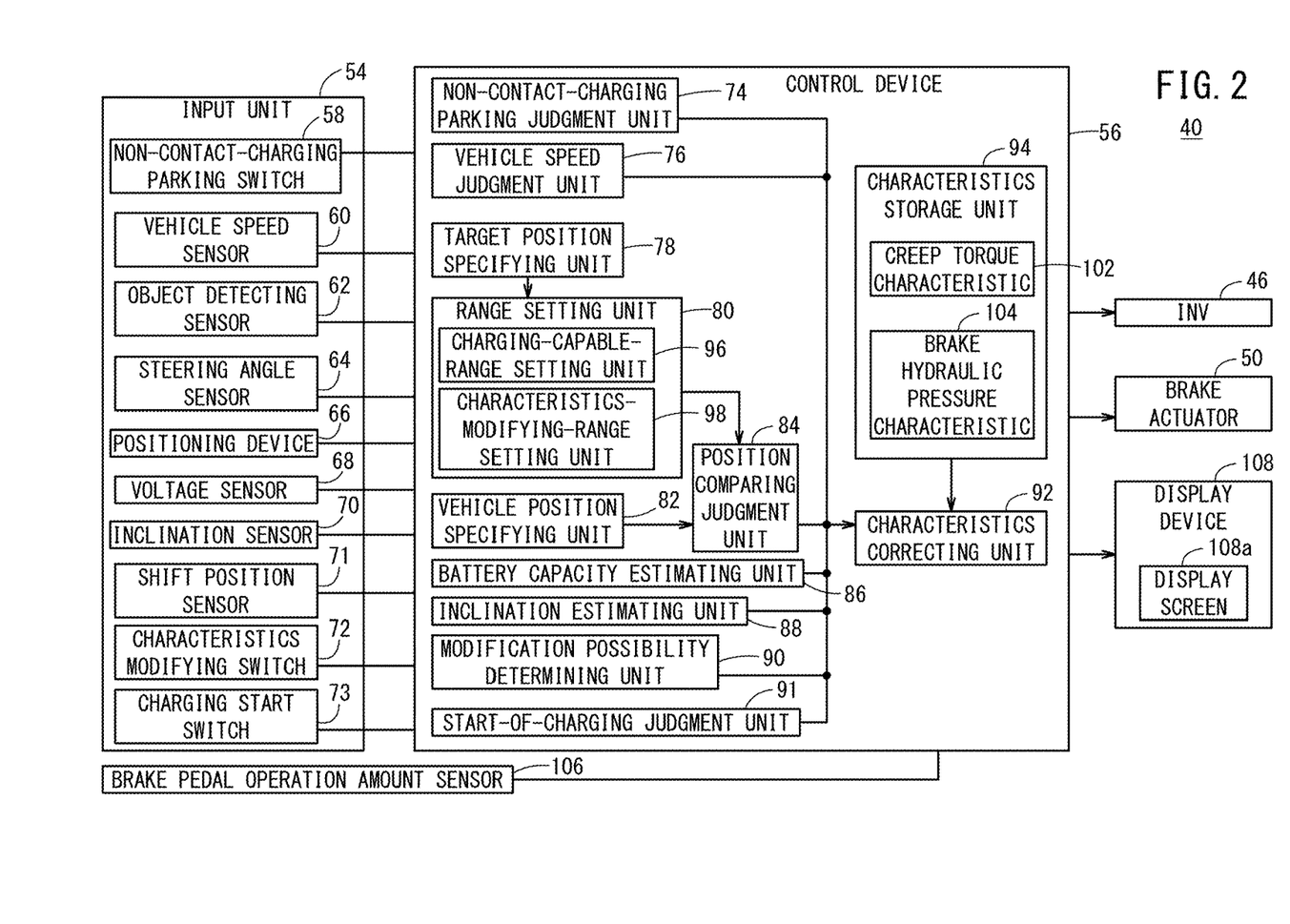
FIG. 2 is a functional block diagram of a vehicle parking control device according to an embodiment of the present invention.

With reference to FIG. 2, the configuration of the vehicle parking control device 40 shown in FIG. 1 will be described. The vehicle parking control device 40 comprises an input unit 54 that inputs to the control device 56 various items of information that are used in the vehicle parking control process, and the control device 56, which implements the vehicle parking control process.

The input unit 54 comprises a non-contact-charging parking switch 58, a vehicle speed sensor 60, an object detecting sensor 62, a steering angle sensor 64, a positioning device 66, a voltage sensor 68, an inclination sensor 70, a shift position sensor 71, a characteristics modifying switch 72, and a charging start switch 73.

The non-contact-charging parking switch 58 is disposed in the vehicle interior of the electric vehicle 14. For example, such a switch may be provided on a dashboard, a console, an operating unit of a display device 108, a touch panel type display screen 108a, or the like. The non-contact-charging parking switch 58 is operated by the driver in the event that the driver intends to carry out parking for non-contact charging. When the non-contact-charging parking switch 58 is operated with the intention of implementing parking for non-contact charging, an execution signal is output to the control device 56.

The vehicle speed sensor 60 detects the vehicle speed of the electric vehicle 14. The object detecting sensor 62 detects the position and shape of the power supplying pad 24. The object detecting sensor 62, for example, is constituted from a camera, radar, or an ultrasonic sensor or the like, which is disposed on the front, the rear, and the lower surface, etc., of the electric vehicle 14. The steering angle sensor 64 is disposed on a steering shaft (not shown) of the electric vehicle 14, and detects the steering angle. The positioning device 66 comprises a device that measures the position of the electric vehicle 14, and measures the position of the electric vehicle 14 by way of a radio navigation method using a GPS receiver, and an autonomous navigation method using a gyro-sensor, a G sensor, etc. The voltage sensor 68 is provided on the battery 34 and detects an output voltage of the battery 34. The inclination sensor 70 is provided at a horizontal position of the electric vehicle 14, and detects an inclination angle in a longitudinal (front/rear) direction of the electric vehicle 14. The shift position sensor 71 is disposed on a shift lever or a transmission, and detects the shift position.

The characteristics modifying switch 72 is disposed in the vehicle interior of the electric vehicle 14. For example, such a switch may be provided on a dashboard, a console, an operating unit of a display device 108, a touch panel type display screen 108a, or the like. The characteristics modifying switch 72 is operated by the driver in the case that the driver intends to modify the accelerator-OFF-state movement characteristics of the vehicle. When the characteristics modifying switch 72 is operated with the intention of modifying the movement characteristics, a modification signal is output to the control device 56.

The charging start switch 73 is disposed in the vehicle interior of the electric vehicle 14. For example, such a switch may be provided on a dashboard, a console, an operating unit of a display device 108, a touch panel type display screen 108a, or the like. The charging start switch 73 is operated by the driver in the event that non-contact charging is started. When the charging start switch 73 is operated with the intention of starting charging, a charging start signal is output to the control device 56.

The control device 56 is constituted by an ECU in the same manner as the external control device 18 of the external power supplying device 12 shown in FIG. 1. In the present embodiment, the control device 56 functions as a non-contact-charging parking judgment unit 74, a vehicle speed judgment unit 76, a target position specifying unit 78, a range setting unit 80, a vehicle position specifying unit 82, a position comparing judgment unit 84, a battery capacity estimating unit 86, an inclination estimating unit 88, a modification possibility determining unit 90, a start-of-charging judgment unit 91, and a characteristics correcting unit 92. The range setting unit 80 is constituted from a charging-capable-range setting unit 96 and a characteristics-modifying-range setting unit 98. Furthermore, the control device 56 comprises a characteristics storage unit 94 in which a creep torque characteristic 102 and a brake hydraulic pressure characteristic 104 are stored.

The control device 56 acquires, from a brake pedal operation amount sensor 106, information concerning the amount at which the brake pedal is operated.

The display device 108 is connected to the control device 56. The display device 108 displays, on the display screen 108a thereof, information that is used by the position comparing judgment unit 84 of the control device 56.

A communications device 110 is connected to the control device 56. Through the communications device 110, the control device 56 transmits information to the external power supplying device 12, and further receives information from the external power supplying device 12.

[Vehicle Parking Control Process 1]

Figure 3:
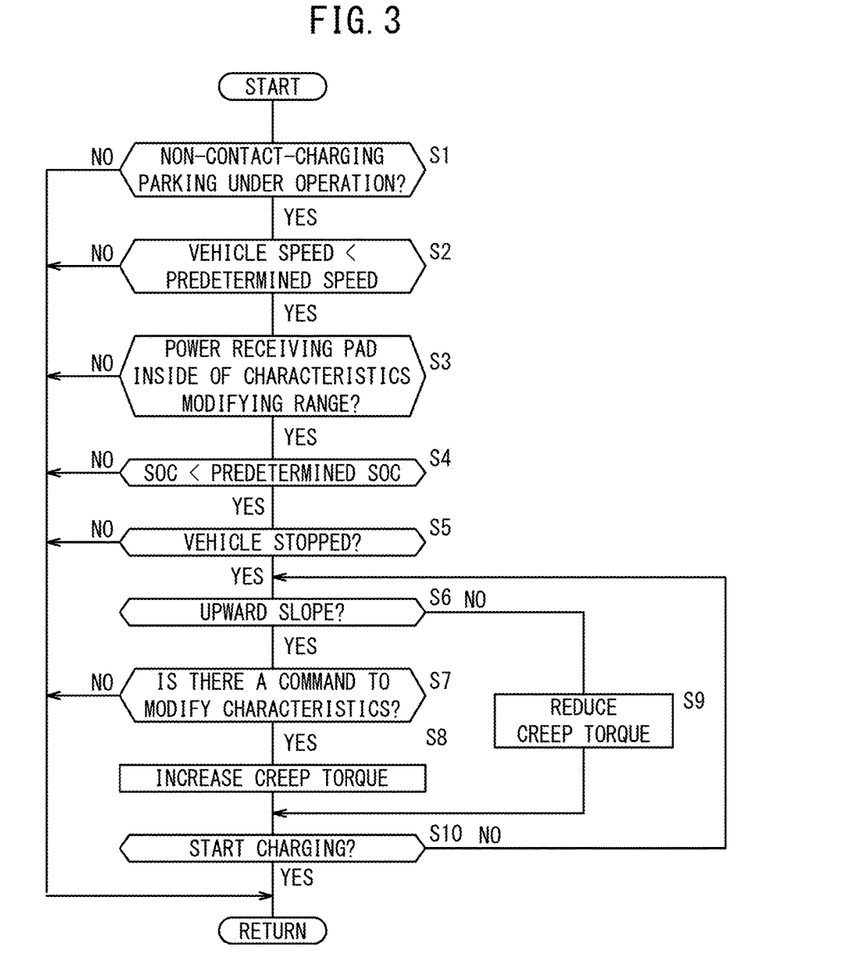
FIG. 3 is a flowchart showing an embodiment of a vehicle parking control process.

With reference to FIG. 3, an example of a vehicle parking control process will be described. In this case, a vehicle parking control process will be described in which a creep torque characteristic 102 is set as an accelerator-OFF-state movement characteristic of the vehicle, which is modified in the event that predetermined conditions are satisfied. Further, the power supplying pad 24 of the external power supplying device 12 is defined as a target position, whereas the power receiving pad 44 of the electric vehicle 14 is defined as a reference position.

In step S1, it is determined whether or not parking for non-contact charging (non-contact-charging parking) is currently under operation. In the event that the driver intends to carry out non-contact-charging parking, the non-contact-charging parking switch 58 is operated from a side indicative of non-intention to execute, to a side indicative of intention to execute non-contact-charging parking. The non-contact-charging parking judgment unit 74 determines whether or not the non-contact-charging parking switch 58 has been operated with the intention of implementing non-contact-charging parking. In the case that the non-contact-charging parking switch 58 has been operated with the intention of implementing non-contact-charging parking (step S1: YES), then the non-contact-charging parking judgment unit 74 outputs information indicative of the fact that such a condition has been satisfied, to the characteristics correcting unit 92. In addition, the process proceeds to step S2. On the other hand, in the case that the non-contact-charging parking switch 58 has been operated with the intention of not implementing non-contact-charging parking (step S1: NO), then the non-contact-charging parking judgment unit 74 outputs information indicative of the fact that the condition has not been satisfied, to the characteristics correcting unit 92. If the characteristics correcting unit 92 receives information indicative of the fact that the condition has not been satisfied, then the control device 56 does not carry out the process of modifying the movement characteristics (in this case, the creep torque characteristic 102) of the vehicle.

In step S2, it is determined whether or not the vehicle speed is less than a predetermined speed. Normally, at a time of non-contact-charging parking, the vehicle speed is decelerated below the predetermined speed, which is set in advance. The vehicle speed judgment unit 76 determines whether or not the vehicle speed detected by the vehicle speed sensor 60 is less than the predetermined speed. In the case that the vehicle speed is less than the predetermined speed (step S2: YES), the vehicle speed judgment unit 76 outputs information indicative of the fact that such a condition has been satisfied, to the characteristics correcting unit 92. In addition, the process proceeds to step S3. On the other hand, in the case that the vehicle speed is greater than or equal to the predetermined speed (step S2: NO), the vehicle speed judgment unit 76 outputs information indicative of the fact that the condition has not been satisfied, to the characteristics correcting unit 92. If the characteristics correcting unit 92 receives information indicative of the fact that the condition has not been satisfied, then the control device 56 does not carry out the process of modifying the movement characteristics (in this case, the creep torque characteristic 102) of the vehicle.

In step S3, it is determined whether or not the power receiving pad 44 is located inside of the characteristics modifying range A2. The processes carried out in step S3 will be described with reference to FIGS. 2, 4A, and 4B.

Figure 4A:
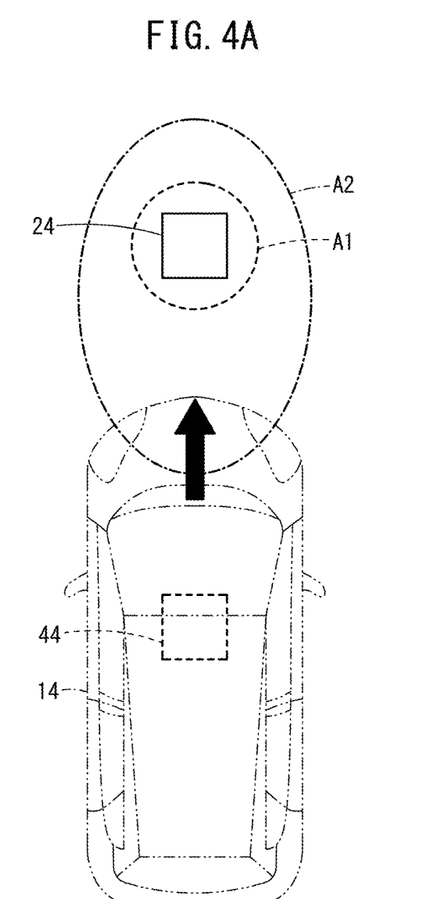
FIGS. 4A and 4B are views showing the behavior of an electric vehicle at a time of parking for non-contact charging.

As shown in FIG. 4A, in the case that the electric vehicle 14 is to be parked for non-contact charging in a forward facing direction with respect to the power supplying pad 24, the power supplying pad 24 and conditions around the periphery thereof are detected by an object detecting sensor 62 that is disposed on the front of the electric vehicle 14. For example, the power supplying pad 24 and conditions around the periphery thereof are captured by a camera. The target position specifying unit 78 recognizes the power supplying pad 24 based on information that is detected by the object detecting sensor 62, and specifies the power supplying pad 24 as a target position.

When the power supplying pad 24 is specified as the target position, the charging-capable-range setting unit 96 sets the charging capable range A1 around the power supplying pad 24, and the characteristics-modifying-range setting unit 98 sets the predetermined characteristics modifying range A2 around the power supplying pad 24 and the charging capable range A1.

The charging capable range A1 is defined by a range in which magnetic coupling between the power supplying coil L1 and the power receiving coil L2 is possible, or in other words, a range within which non-contact charging can be performed. As the charging capable range A1, a fixed range is set centrally about the power supplying pad 24. In the case that the power supplying coil L1 that is embedded within the power supplying pad 24 is of a circular shape, as shown in FIG. 4A, the charging capable range A1 also is of a substantially circular shape. The shape and area of the charging capable range A1 may be changed corresponding to the shape of the power supplying coil L1.

The characteristics modifying range A2 is defined by a range in which the accelerator-OFF-state movement characteristics of the vehicle, in this case the creep torque characteristic 102, are capable of being modified. For example, as shown in FIG. 4A, the characteristics modifying range A2 is set to be larger than the charging capable range A1, and is set around the periphery of the charging capable range A1. Further, the shape of the characteristics modifying range A2 is an oblong circular shape having a major axis oriented parallel to the direction of approach of the electric vehicle 14 with respect to the power supplying pad 24, and a minor axis oriented perpendicular to the direction of approach. Furthermore, the position of the characteristics modifying range A2 is set such that the center of the characteristics modifying range A2 is shifted toward the side of the electric vehicle 14. In this manner, the shape of the characteristics modifying range A2 is longitudinally elongate, and the center thereof is shifted toward the side of the electric vehicle 14, whereby the characteristics modifying range A2 is made larger on the side of the electric vehicle 14. The shape and area of the characteristics modifying range A2 can be set freely.

The vehicle position specifying unit 82 specifies the position of the electric vehicle 14 based on position information of the electric vehicle 14 that is detected by the positioning device 66, and specifies the position of the power receiving pad 44 that serves as the reference position.

The vehicle position specifying unit 82 is capable of specifying the position of the electric vehicle 14 in the following manner. The vehicle position specifying unit 82 recognizes the target position (position of the power supplying pad 24) that was specified by the target position specifying unit 78, and calculates the reference position of the electric vehicle 14 (position of the power receiving pad 44) relative to the target position by referring to previously stored specification information (arrangement of the power receiving pad 44 within the electric vehicle 14). This calculation is carried out continuously during non-contact-charging parking. In the event that two or more object detecting sensors 62 are used, for example, in the case that a camera provided on the front of the electric vehicle 14 and an ultrasonic sensor provided on the lower surface of the electric vehicle 14 are employed, information of the camera and information of the ultrasonic sensor are combined. Therefore, the vehicle position specifying unit 82 is capable of continuously specifying the reference position with respect to the target position.

Further, the vehicle position specifying unit 82 is capable of specifying the position of the electric vehicle 14 in the following manner. The vehicle position specifying unit 82 recognizes at an arbitrary timing the target position (position of the power supplying pad 24) that was specified by the target position specifying unit 78. Next, the travel trajectory of the electric vehicle 14 is calculated from the vehicle speed, which is detected by the vehicle speed sensor 60, and the steering angle, which is detected by the steering angle sensor 64. This calculation is carried out continuously during non-contact-charging parking. In addition, the reference position with respect to the target position recognized at an arbitrary timing is updated based on the travel trajectory.

For example, as shown in FIGS. 4A, 4B, 5A and 5B, the charging capable range A1, the characteristics modifying range A2, the target position (the position of the power supplying pad 24), and the reference position (the position of the power receiving pad 44) are displayed on the display screen 108a of the display device 108. Thus, the driver is capable of performing non-contact-charging parking while visually confirming the target position and the reference position displayed on the display screen 108a.

Figure 4B:
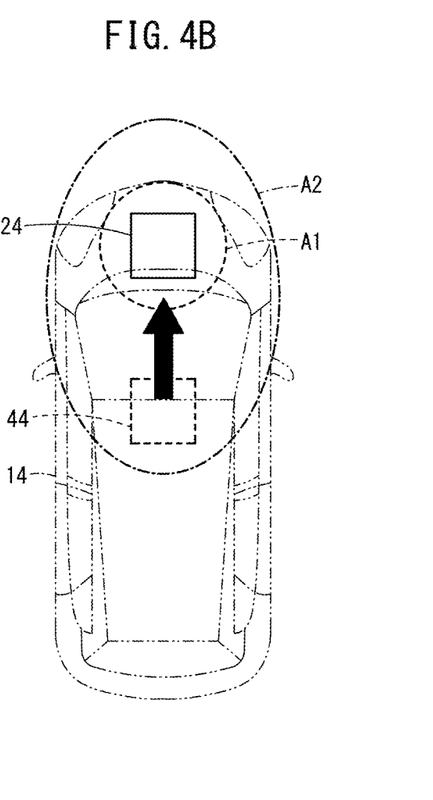

The position comparing judgment unit 84 compares the reference position, which is specified by the vehicle position specifying unit 82, and the characteristics modifying range A2, which is set by the characteristics-modifying-range setting unit 98, and determines whether or not the reference position resides inside of the characteristics modifying range A2. For example, as shown in FIG. 4B, if the reference position is inside of the characteristics modifying range A2 (step S3: YES), the position comparing judgment unit 84 outputs information indicative of the fact that such a condition has been satisfied, to the characteristics correcting unit 92. In addition, the process proceeds to step S4. On the other hand, as shown in FIG. 4A, if the reference position is not inside of the characteristics modifying range A2 (step S3: NO), the position comparing judgment unit 84 outputs information indicative of the fact that the condition has not been satisfied, to the characteristics correcting unit 92. If the characteristics correcting unit 92 receives information indicative of the fact that the condition has not been satisfied, then the control device 56 does not carry out the process of modifying the movement characteristics (in this case, the creep torque characteristic 102) of the vehicle.

In step S4, it is determined whether or not SOC (State of Charge) is less than a predetermined SOC. The battery capacity estimating unit 86 determines the SOC of the battery 34 based on the voltage of the battery 34, which is detected by the voltage sensor 68. In the case that the SOC is less than the predetermined SOC (step S4: YES), the battery capacity estimating unit 86 outputs information indicative of the fact that such a condition has been satisfied, to the characteristics correcting unit 92. In addition, the process proceeds to step S5. On the other hand, in the case that the SOC is greater than or equal to the predetermined SOC (step S4: NO), the battery capacity estimating unit 86 outputs information indicative of the fact that the condition has not been satisfied, to the characteristics correcting unit 92. If the characteristics correcting unit 92 receives information indicative of the fact that the condition has not been satisfied, then the control device 56 does not carry out the process of modifying the movement characteristics (in this case, the creep torque characteristic 102) of the vehicle.

Figure 5A:
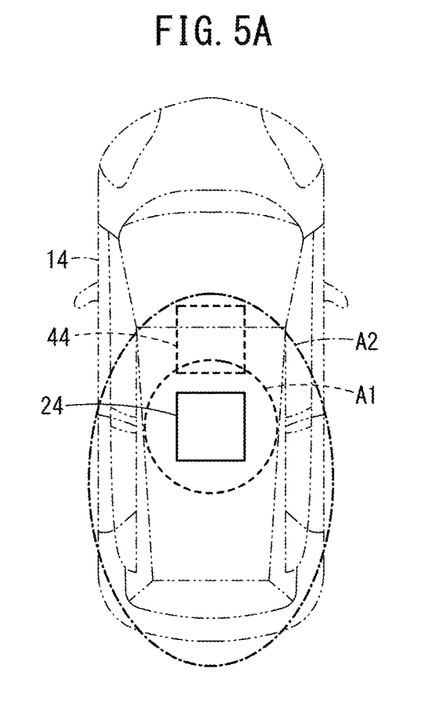
FIGS. 5A and 5B are views showing the behavior of the electric vehicle at a time of parking for non-contact charging.
Figure 5B:
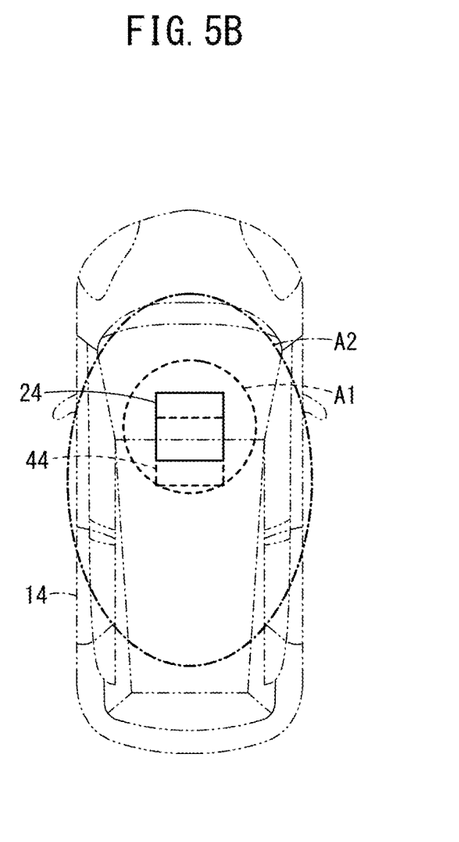

In step S5, it is determined whether or not the electric vehicle 14 has come to a stop. For example, as shown in FIG. 5A, in the case that the reference position has exceeded the target position, or as shown in FIG. 5B, in the case that the reference position has entered into the charging capable range A1, the driver causes the electric vehicle 14 to stop temporarily. The vehicle speed judgment unit 76 determines whether or not the vehicle speed detected by the vehicle speed sensor 60 is zero. In the case that the vehicle speed is zero, i.e., if the vehicle is stopped (step S5: YES), the vehicle speed judgment unit 76 outputs information indicative of the fact that such a condition has been satisfied, to the characteristics correcting unit 92. In addition, the process proceeds to step S6. On the other hand, in the case that the vehicle speed is not zero, i.e., if the vehicle is not stopped (step S5: NO), the vehicle speed judgment unit 76 outputs information indicative of the fact that the condition has not been satisfied, to the characteristics correcting unit 92. If the characteristics correcting unit 92 receives information indicative of the fact that the condition has not been satisfied, then the control device 56 does not carry out the process of modifying the movement characteristics (in this case, the creep torque characteristic 102) of the vehicle.

In step S6, it is determined whether or not the direction of travel of the electric vehicle 14 is on an upward slope. The inclination estimating unit 88 detects the direction of travel of the electric vehicle 14 based on the shift position that is detected by the shift position sensor 71. Furthermore, the inclination estimating unit 88 determines whether or not the direction of travel of the electric vehicle 14 is on an upward slope based on the inclination angle that is detected by the inclination sensor 70. The inclination estimating unit 88 estimates the inclination angle in the travel direction of the electric vehicle 14 from a relationship between the vehicle speed, which is detected by the vehicle speed sensor 60 just prior to stopping, the operation amount of the accelerator, and the torque characteristic, and thus is capable of determining whether the travel direction is on an upward slope or not. Furthermore, based on the information from the positioning device 66, it can be determined whether or not the direction of travel of the electric vehicle 14 is on an upward slope. In the case that the travel direction of the electric vehicle 14 is on an upward slope (step S6: YES), the process proceeds to step S7. On the other hand, in the case that the travel direction of the electric vehicle 14 is on a flat surface or on a downward slope (step S6: NO), the inclination estimating unit 88 outputs information directing that the creep torque be reduced, to the characteristics correcting unit 92. In addition, the process proceeds to step S9.

In step S7, it is determined whether or not there is a command to change the characteristics from the driver. In the case that the travel direction of the electric vehicle 14 is on an upward slope, it is necessary for the creep torque to be increased. However, if the creep torque is increased on a gentle upward slope, situations may occur in which the vehicle speed becomes rapid contrary to the intentions of the driver. Therefore, according to the present embodiment, in the event that the creep torque is increased, it is possible for a modification of the creep torque characteristic 102 to be confirmed with the driver. In the event that the driver intends to modify the creep torque so as to increase, the characteristics modifying switch 72 is operated from a side indicative of no modification to a side indicative of an intention to modify the creep torque. The modification possibility determining unit 90 determines whether or not the characteristics modifying switch 72 has been operated with the intention of modifying the creep torque. In the case that the characteristics modifying switch 72 has been operated with the intention of modifying (step S7: YES), the modification possibility determining unit 90 outputs information directing that the creep torque be increased, to the characteristics correcting unit 92. In addition, the process proceeds to step S8. On the other hand, in the case that the characteristics modifying switch 72 has been operated with the intention of not modifying (step S7: NO), then the modification possibility determining unit 90 outputs information indicative of the fact that the condition has not been satisfied, to the characteristics correcting unit 92. If the characteristics correcting unit 92 receives information indicative of the fact that the condition has not been satisfied, then the control device 56 does not carry out the process of modifying the movement characteristics (in this case, the creep torque characteristic 102) of the vehicle.

Figure 6:
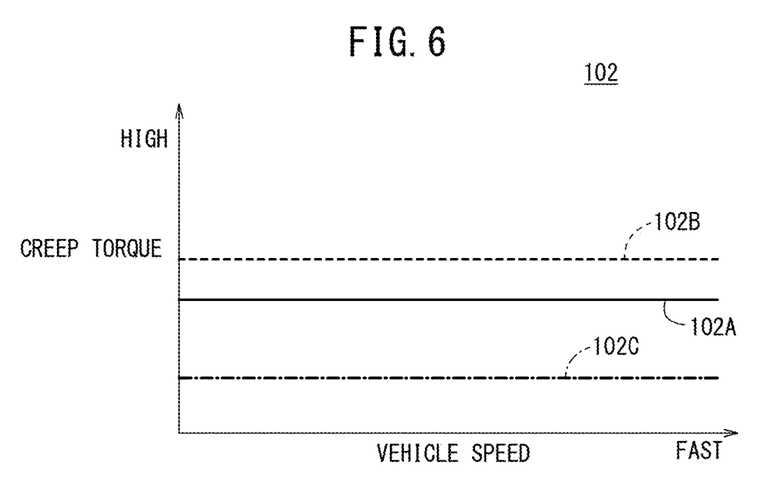
FIG. 6 is a view showing a creep torque characteristic.

In accordance with the above process, in the event that the direction of travel of the electric vehicle 14 is on an upward slope, and if the driver is indicating an intention to modify the creep torque characteristic 102, then in step S8, the creep torque characteristic 102 is increased. When the characteristics correcting unit 92 receives information indicating that the conditions have been satisfied, from the non-contact-charging parking judgment unit 74, the vehicle speed judgment unit 76, the position comparing judgment unit 84, and the battery capacity estimating unit 86, and further receives information indicative of the fact that the creep torque characteristic 102 is to be increased, from the modification possibility determining unit 90, the creep torque characteristic 102 is modified. At this time, as shown in FIG. 6, the creep torque characteristic 102 is changed to a creep torque characteristic 102B, which is higher than a creep torque characteristic 102A at a time of normal operation. When this is done, the creep torque of the electric vehicle 14 is increased more so than at normal times. Moreover, in the case that the creep torque characteristic 102 has already been changed to the creep torque characteristic 102B, the creep torque characteristic 102B is maintained.

On the other hand, in the case that the travel direction of the electric vehicle 14 is on a flat surface or on a downward slope, then in step S9, the creep torque characteristic 102 is reduced. When the characteristics correcting unit 92 receives information indicating that the conditions have been satisfied, from the non-contact-charging parking judgment unit 74, the vehicle speed judgment unit 76, the position comparing judgment unit 84, and the battery capacity estimating unit 86, and further receives information indicative of the fact that the creep torque characteristic 102 is to be decreased, from the inclination estimating unit 88, the creep torque characteristic 102 is modified. At this time, as shown in FIG. 6, the creep torque characteristic 102 is changed to a creep torque characteristic 102C, which is lower than the creep torque characteristic 102A at a time of normal operation. When this is done, the creep torque of the electric vehicle 14 is decreased more so than at normal times. Moreover, in the case that the creep torque characteristic 102 has already been changed to the creep torque characteristic 102C, the creep torque characteristic 102C is maintained.

In step S10, it is determined whether or not charging should be started. When the driver parks the electric vehicle 14 in a desired position, the charging start switch 73 is operated to initiate non-contact charging. At this time, the start-of-charging judgment unit 91 determines whether or not the charging start switch 73 is operated to start charging. If the charging start switch 73 is operated to start charging (step S10: YES), the start-of-charging judgment unit 91 outputs information indicative of start of charging, to the characteristics correcting unit 92. When the characteristics correcting unit 92 receives information indicative of the start of charging, the movement characteristics (in this case, the creep torque characteristic 102) of the vehicle are changed to the characteristic (the creep torque characteristic 102A) at the time of normal operation. On the other hand, if the charging start switch 73 is not operated to start charging (step S10: NO), the process returns to step S6.

In the foregoing manner, in the case that all of the predetermined conditions have been satisfied, the electric vehicle 14 increases or decreases the creep torque characteristic 102. On the other hand, in the event that even one of the predetermined conditions is not satisfied, switching of the creep torque characteristic 102 is prohibited.

[Vehicle Parking Control Process 2]

Figure 7:
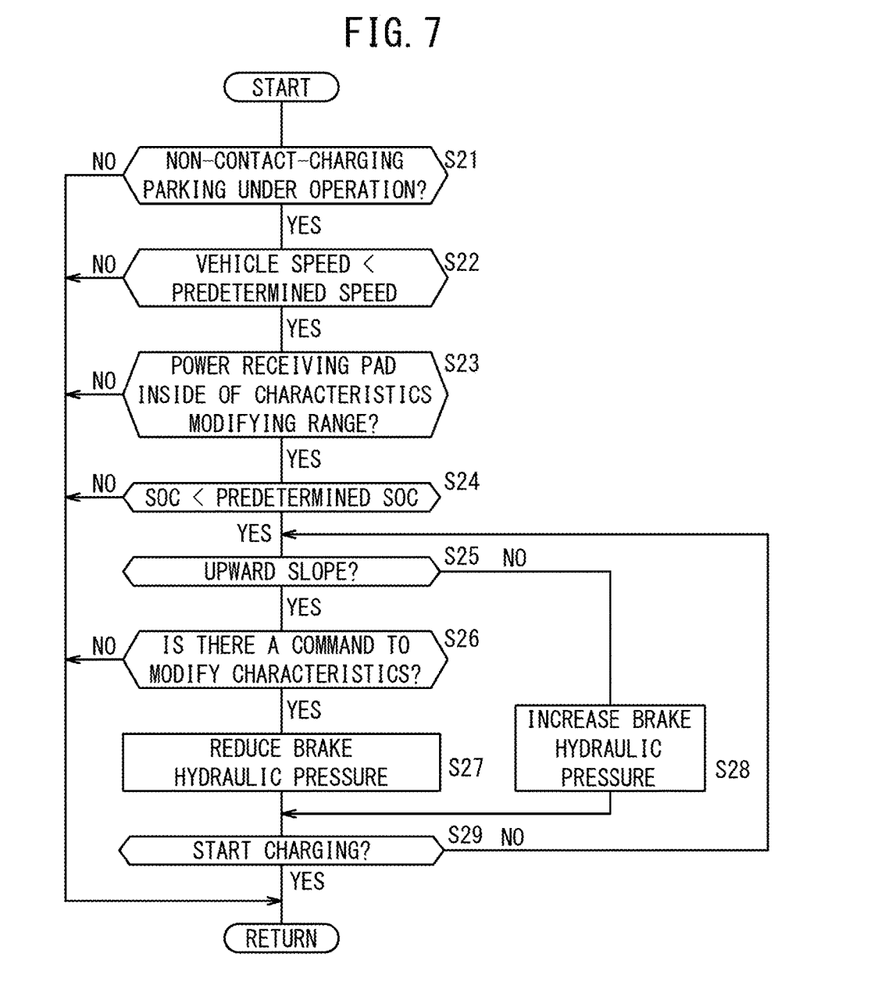
FIG. 7 is a flowchart of another embodiment of the vehicle parking control process.

FIG. 7 shows another example of the vehicle parking control process, which differs from that shown in FIG. 3. With such a non-contact-charging parking process, a brake hydraulic pressure characteristic 104 is set as an accelerator-OFF-state movement characteristic of the vehicle, which is modified in the event that predetermined conditions are satisfied.

In several aspects, the vehicle parking control process shown in FIG. 7 is the same as the vehicle parking control process shown in FIG. 3. The processes of steps S21 to S24 shown in FIG. 7 are the same as the processes of steps S1 to S4 shown in FIG. 3. Further, the processes of steps S25, S26 and S29 shown in FIG. 7 are substantially the same as the processes of steps S6, S7 and S10 shown in FIG. 3. Therefore, in relation to the vehicle parking control process shown in FIG. 7, descriptions of portions thereof that coincide with the vehicle parking control process shown in FIG. 3 are omitted.

The vehicle parking control process shown in FIG. 7 does not include the process of step S5 of the vehicle parking control process shown in FIG. 3. Although in the vehicle parking control process shown in FIG. 3, temporary stopping and the stopped position of the vehicle are treated as predetermined conditions, in the vehicle parking control process shown in FIG. 7, temporary stopping of the vehicle itself is not treated as a predetermined condition. The reason therefor is as follows. Even if modification of the brake hydraulic pressure characteristic 104 is carried out during traveling of the electric vehicle 14, there is no influence on the vehicle speed under a condition in which the brake 52 is not operated. Further, even if the brake hydraulic pressure is changed during operation of the brake 52, the influence thereon is small. Even if the vehicle speed were to become faster, such a situation can be handle by the driver increasing the amount at which the brake 52 is depressed. Therefore, in the case that the brake hydraulic pressure characteristic 104 is modified, it is unnecessary for a judgment of temporary stopping of the electric vehicle 14 to be made.

Figure 8:
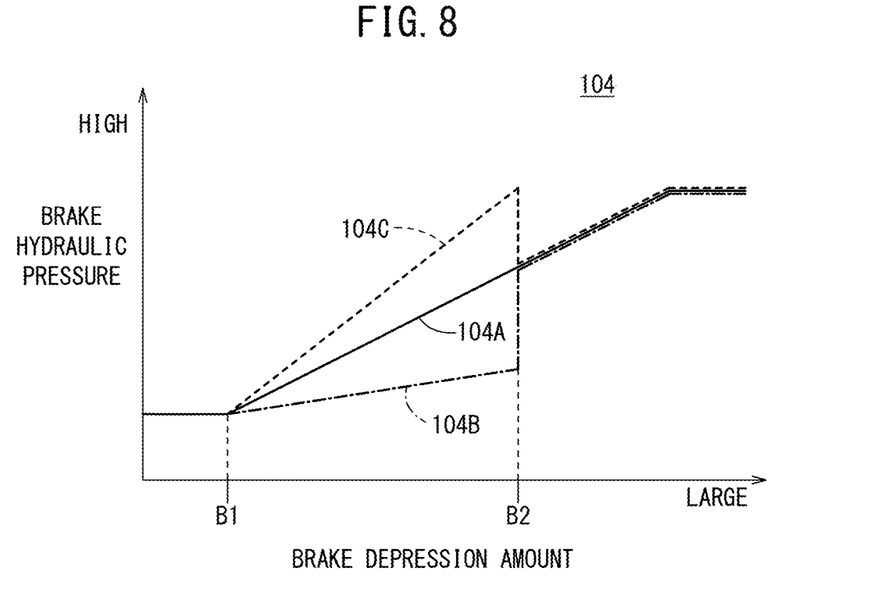
FIG. 8 is a view showing a brake hydraulic pressure characteristic.

In the event that the stopped position of the electric vehicle 14 is on an upward slope, and further, if the driver is indicating an intention to modify the brake hydraulic pressure characteristic 104, then in step S27, the brake hydraulic pressure characteristic 104 is reduced. When the characteristics correcting unit 92 receives information indicating that the conditions have been satisfied, from the non-contact-charging parking judgment unit 74, the vehicle speed judgment unit 76, the position comparing judgment unit 84, and the battery capacity estimating unit 86, and further receives information indicative of the fact that the brake hydraulic pressure characteristic 104 is to be reduced, from the modification possibility determining unit 90, the brake hydraulic pressure characteristic 104 is modified. At this time, as shown in FIG. 8, the brake hydraulic pressure characteristic 104 is changed to a brake hydraulic pressure characteristic 104B from a brake hydraulic pressure characteristic 104A at the time of normal operation. When this is done, the rate of rise of the brake hydraulic pressure from the initial depression amount B1 of the brake 52 up to the depression amount B2 thereof is reduced more so than at normal times. Moreover, in the case that the brake hydraulic pressure characteristic 104 has already been changed to the brake hydraulic pressure characteristic 104B, the brake hydraulic pressure characteristic 104B is maintained.

In the case that the position of the electric vehicle 14 is on a flat surface or on a downward slope, then in step S28, the brake hydraulic pressure characteristic 104 is increased. When the characteristics correcting unit 92 receives information indicating that the conditions have been satisfied, from the non-contact-charging parking judgment unit 74, the vehicle speed judgment unit 76, the position comparing judgment unit 84, and the battery capacity estimating unit 86, and further receives information indicative of the fact that the brake hydraulic pressure characteristic 104 is to be increased, from the inclination estimating unit 88, the brake hydraulic pressure characteristic 104 is modified. At this time, as shown in FIG. 8, the brake hydraulic pressure characteristic 104 is changed to a brake hydraulic pressure characteristic 104C from the brake hydraulic pressure characteristic 104A at the time of normal operation. When this is done, the rate of rise of the brake hydraulic pressure from the initial depression amount B1 of the brake 52 up to the depression amount B2 thereof is increased more so than at normal times. Moreover, in the case that the brake hydraulic pressure characteristic 104 has already been changed to the brake hydraulic pressure characteristic 104C, the brake hydraulic pressure characteristic 104C is maintained.

In the foregoing manner, in the case that all of the predetermined conditions have been satisfied, the electric vehicle 14 increases or decreases the brake hydraulic pressure characteristic 104. On the other hand, in the event that even one of the predetermined conditions is not satisfied, switching of the brake hydraulic pressure characteristic 104 is prohibited.

[Summary Of The Present Embodiment]

The vehicle parking control device 40 according to the present embodiment includes the target position specifying unit 78, the predetermined range setting unit (characteristics-modifying-range setting unit 98), the judgment unit (position comparing judgment unit 84), and the switching unit (characteristics correcting unit 92). The target position specifying unit 78 specifies a target position (power supplying pad 24) as a target at a time when the electric vehicle 14 is stopped. The predetermined range setting unit (characteristics-modifying-range setting unit 98) sets a predetermined range (characteristics modifying range A2) that includes the target position (power supplying pad 24). The judgment unit (position comparing judgment unit 84) determines whether or not a reference position (power receiving pad 44) of the electric vehicle 14 is positioned inside of the predetermined range (characteristics modifying range A2). The switching unit (characteristics correcting unit 92) switches between acceleration-OFF-state movement characteristics (creep torque characteristic 102, brake hydraulic pressure characteristic 104) of the vehicle, when the reference position (power receiving pad 44) of the electric vehicle 14 is positioned inside of the predetermined range (characteristics modifying range A2) (step S3), and further when predetermined conditions (steps S1, S2, S4, S5, S7, S21, S22, S24 and S26) are satisfied.

According to the present invention, since the acceleration-OFF-state movement characteristics (creep torque characteristic 102, brake hydraulic pressure characteristic 104) of the electric vehicle 14 are switched when the parking operation is performed, it becomes easy to adjust the position of the electric vehicle 14 and parking accuracy can be improved. As a result, parking can be performed at a position with high charging efficiency, and charging efficiency can be improved. Furthermore, since the acceleration-OFF-state movement characteristics (creep torque characteristic 102, brake hydraulic pressure characteristic 104) are switched not only by ensuring that the reference position (power receiving pad 44) of the electric vehicle 14 is positioned inside of the predetermined range (characteristics modifying range A2), but also by ensuring that other predetermined conditions (steps S1, S2, S4, S5, S7, S21, S22, S24 and S26) are satisfied, vehicle operations during parking can be carried out without the driver experiencing any sense of discomfort.

Further, in the present embodiment, it is possible for the switching unit (characteristics correcting unit 92) to switch between the movement characteristics of the electric vehicle 14 by modifying the creep torque characteristic 102 of the electric vehicle 14. In this manner, since the creep torque, which does not rely on the accelerator pedal operation amount in accordance with the intentions of the driver, is modified, the electric vehicle 14 does not assume behaviors that are contrary to the intentions of the driver. Therefore, the driver does not experience any sense of discomfort in operating the vehicle.

Further, according to the present embodiment, the vehicle speed judgment unit 76 is provided that determines the vehicle speed. In addition, while the reference position (power receiving pad 44) of the electric vehicle 14 is positioned inside of the predetermined range (characteristics modifying range A2), that the vehicle speed judgment unit 76 detects that the vehicle speed has become zero (step S5) is regarded as the predetermined condition. In this manner, since the creep torque characteristic 102 is modified after the vehicle speed has become zero, that is, after having temporarily stopped, the behavior of the electric vehicle 14 does not change suddenly. Therefore, the driver does not experience any sense of discomfort in operating the vehicle.

Further, in the present invention, it is possible for the switching unit (characteristics correcting unit 92) to switch between the movement characteristics of the electric vehicle 14 by modifying the brake hydraulic pressure characteristic 104 with respect to a brake depression amount. In this manner, by modifying the brake hydraulic pressure characteristic 104, the electric vehicle 14 can be stopped by the driver increasing the amount at which the brake is depressed. Therefore, in the event that the electric vehicle 14 behaves contrary to the intentions of the driver, the driver can stop the vehicle immediately.

Further, according to the present embodiment, the inclination estimating unit 88 is provided that estimates an inclination state in the longitudinal direction of the electric vehicle 14. The switching unit (characteristics correcting unit 92) switches between the movement characteristics of the electric vehicle 14 depending on the inclination state of the electric vehicle 14 that is estimated by the inclination estimating unit 88. By estimating the direction of inclination in this manner, whether the parking position is on an upward slope or a downward slope, the appropriate movement characteristic (creep torque characteristic 102, brake hydraulic pressure characteristic 104) can be selected. Therefore, stopping or acceleration of the vehicle contrary to the intentions of the driver can be suppressed.

Further, in the present embodiment, the target position is an installation position of the power supplying unit (power supplying pad 24) that supplies electric power by way of magnetism, and the reference position of the electric vehicle 14 is a mounted position of the power receiving unit (power receiving pad 44) that receives electric power by way of magnetic coupling with the power supplying unit (power supplying pad 24). The predetermined range (characteristics modifying range A2) is greater than the charging capable range A1 within which the power supplying unit (power supplying pad 24) and the power receiving unit (power receiving pad 44) are capable of being magnetically coupled. In this manner, by enlarging the predetermined range (characteristics modifying range A2) to be greater than the charging capable range A1, the movement characteristics (creep torque characteristic 102, brake hydraulic pressure characteristic 104) can be modified before the power receiving unit (power receiving pad 44) of the electric vehicle 14 becomes positioned inside of the charging capable range A1 in which non-contact charging is possible. Therefore, when the power receiving unit (power receiving pad 44) is aligned in position with respect to the power supplying unit (power supplying pad 24), a number of back-and-forth movements of the electric vehicle 14 can be suppressed.

Further, in the present embodiment, the battery capacity estimating unit 86 is further provided that estimates a state of charge of the battery 34, wherein the battery capacity estimating unit 86 estimating the state of charge of the battery 34 as being less than or equal to a predetermined value is regarded as the predetermined condition. In this manner, by switching the vehicle characteristics only in the case where the capacity of the battery 34 is low and it is necessary for charging to be performed in a short time, stress at the time of parking can be reduced.

In addition, the present embodiment further comprises the display device 108 that displays the predetermined range (characteristics modifying range A2) and the charging capable range A1. In this manner, by displaying on the display device 108 the predetermined range (characteristics modifying range A2) and the charging capable range A1 at the time of parking, parking accuracy can be improved.

Further, in the present embodiment, the switching unit (characteristics correcting unit 92) prohibits the movement characteristics (creep torque characteristic 102, brake hydraulic pressure characteristic 104) from being switched in the event that the predetermined conditions (steps S1, S2, S4, S5, S7, S21, S22, S24 and S26) are not satisfied. Therefore, unnecessary switching can be suppressed, and drivability can be enhanced.

[Other Embodiments]

According to the above-described embodiment, it is determined whether the creep torque characteristic 102 (or the brake hydraulic pressure characteristic 104) should be increased or reduced depending on the direction of inclination. However, not only that, but it is also possible for the amount of change of the creep torque characteristic 102 or the brake hydraulic pressure characteristic 104 to be changed depending on the inclination angle. More specifically, the amounts by which the creep torque characteristic 102 and the brake hydraulic pressure characteristic 104 are corrected are made greater as the inclination angle of the upward slope or the downward slope becomes greater. In this case, the correction amounts for the creep torque characteristic 102 and the brake hydraulic pressure characteristic 104 corresponding to the inclination angle may be stored in advance, and the correction amounts may be determined appropriately responsive to the detected inclination angle.

The processes of step S4 and step S7 shown in FIG. 3, and the processes of step S24 and step S26 shown in FIG. 7 can be omitted.

Further, it is also possible to switch both the creep torque characteristic 102 and the brake hydraulic pressure characteristic 104.

Further, in the above-described embodiment, although the vehicle parking control device according to the present invention is used in a non-contact charging system, the vehicle parking control device according to the present invention may also be utilized in other systems apart from a non-contact charging system.

While the invention has been particularly shown and described with reference to the preferred embodiment, it will be understood that variations and modifications can be effected thereto by those skilled in the art without departing from the scope of the invention as defined by the appended claims.

What is claimed is:

1. A vehicle parking control device comprising:
a vehicle electronic control unit for controlling a vehicle, the vehicle electronic control unit being configured to:
    specify a target position as a target at a time when the vehicle is stopped, the target position being an installation position of a power supplying pad for electric power supply by way of magnetism;
    set a predetermined range that includes the target position, wherein the predetermined range is a range that is greater than a charging capable range within which a power supplying pad and a power receiving pad are capable of being magnetically coupled;
    determine whether or not a reference position of the vehicle is positioned inside of the predetermined range, the reference position being a mounted position of the power receiving pad;
    estimate an inclination state in a longitudinal direction of the vehicle;
    estimate a state of charge of a battery; and
    switch between creep torque characteristics of the vehicle, in response to determining that a predetermined condition that the reference position of the vehicle is positioned inside of the predetermined range and an estimated state of charge of the battery is less than a predetermined value is satisfied,
wherein the creep torque characteristics are switched so as to increase a creep torque in response to an estimated vehicular inclination state of an upward slope and to decrease the creep torque in response to the estimated vehicular inclination state of a flat or downward slope.

2. The vehicle parking control device according to claim 1, wherein the vehicle electronic control unit is further configured to determine a vehicle speed; and
wherein, while the vehicle electronic control unit determines that the reference position of the vehicle is positioned inside of the predetermined range, the predetermined condition is that the vehicle electronic control unit detects that the vehicle speed has become zero.

3. The vehicle parking control device according to claim 2, wherein if the predetermined condition is not satisfied, the vehicle electronic control unit is further configured to prohibit the creep torque characteristics from being switched.

4. The vehicle parking control device according to claim 1, further comprising a display device configured to display the predetermined range and the charging capable range.

5. The vehicle parking control device according to claim 4, wherein if the predetermined condition is not satisfied, the vehicle electronic control unit is further configured to prohibit the creep torque characteristics from being switched.

6. The vehicle parking control device according to claim 1, wherein if the predetermined condition is not satisfied, the vehicle electronic control unit is further configured to prohibit the creep torque characteristics from being switched.

7. A vehicle parking control device comprising:
a vehicle electronic control unit for controlling a vehicle, the vehicle electronic control unit being configured to:
    specify a target position as a target at a time when a vehicle is stopped, the target position being an installation position of a power supplying pad for electric power supply by way of magnetism;
    set a predetermined range that includes the target position, wherein the predetermined range is a range that is greater than a charging capable range within which a power supplying pad and a power receiving pad are capable of being magnetically coupled;
    determine whether or not a reference position of the vehicle is positioned inside of the predetermined range, the reference position being a mounted position of the power receiving pad;
    estimate an inclination state in a longitudinal direction of the vehicle;
    store a brake hydraulic pressure characteristic; and
    modify the brake hydraulic pressure characteristic when the reference position of the vehicle is positioned inside of the predetermined range,
wherein a brake hydraulic pressure characteristic is modified so that a rate of rise of the brake hydraulic pressure decreases in response to an estimated vehicular inclination state of an upward slope and increases in response to estimated vehicular inclination state of a flat or downward slope.

* * * * *